United States Patent [19]
Burmeister et al.

[11] Patent Number: 5,339,428
[45] Date of Patent: Aug. 16, 1994

[54] COMPILER ALLOCATING A REGISTER TO A DATA ITEM USED BETWEEN A USE AND STORE OF ANOTHER DATA ITEM PREVIOUSLY ALLOCATED TO THE REGISTER

[75] Inventors: Curt K. Burmeister, Somerville, Mass.; Kevin W. Harris, Nashua; William B. Noyce, Hollis, both of N.H.; Steven O. Hobbs, Westford, Mass.

[73] Assignee: Digital Equipment Corporation, Maynard, Mass.

[21] Appl. No.: 754,549

[22] Filed: Sep. 4, 1991

[51] Int. Cl.$^5$ .................... G06F 12/02; G06F 9/45
[52] U.S. Cl. .................... 395/700; 395/375; 395/650; 364/250.4; 364/281.1; 364/282.2; 364/DIG. 1
[58] Field of Search .................... 395/700, 650, 375; 364/DIG. 1, DIG. 2

[56] References Cited

U.S. PATENT DOCUMENTS

| | | | |
|---|---|---|---|
| 4,435,753 | 3/1984 | Rizzi | 395/700 |
| 4,571,678 | 2/1986 | Chaitin | 395/700 |
| 4,642,764 | 2/1987 | Auslander et al. | 395/700 |
| 4,656,582 | 4/1987 | Chaitin et al. | 395/700 |
| 4,667,290 | 5/1987 | Goss et al. | 395/700 |
| 4,782,444 | 11/1988 | Munshi et al. | 395/700 |
| 4,953,084 | 8/1990 | Meloy et al. | 395/700 |

OTHER PUBLICATIONS

Aho and Ullman, *Principles of Compiler Design*, Sec. 12.5, pp. 429–440.

Chatin, Auslander, Chandra, Cocke, Hopkins, Markstein, "Register Allocation via Coloring," *Computer Languages*, vol. 6, pp. 47–57, 1981.

*Primary Examiner*—Thomas C. Lee
*Assistant Examiner*—Larry J. Ellcessor
*Attorney, Agent, or Firm*—Clayton L. Satow; Barry N. Young; Albert P. Cefalo

[57] ABSTRACT

A compiler includes a register allocation method making use of the concept of assigning temporary items to lifetime holes if such holes exist that are suitable. The compiler includes a front end for converting the input code to an intermediate representation, then this input representation is traversed to identify all of the temporary items, and to find all of the holes in the temporary items. Lists are maintained of the identified temporaries and holes. Register allocation then includes assigning temporaries to registers so long as there are free registers, and if holes are available in already-assigned temporaries then these holes are used in assigning registers. After all the available registers and holes are used, remaining temporaries are unallocated and thus represent memory references.

19 Claims, 10 Drawing Sheets

```
SUBROUTINE ROUT1 (i)  ⎤
                      ⎥ NODE-1
IF (i.LT.100) GOTO 10 ⎦ i=0                   ] NODE-2

10  RETURN            ] NODE-3
```

COMPILER ALLOCATING A REGISTER TO A DATA ITEM USED BETWEEN A USE AND STORE OF ANOTHER DATA ITEM PREVIOUSLY ALLOCATED TO THE REGISTER

BACKGROUND OF THE INVENTION

This invention relates to optimizing computer code, and more particularly to a method of register allocation in an optimizing compiler or the like.

A compiler usually operates by accepting as an input computer language in one form, e.g., source code in a high level language, and producing as an output computer language of another form, usually object code for a particular target architecture. The objective, of course, is for the high level language to be as easy as possible for the programmer to use in expressing the algorithms, and yet make the object code as fast and efficient as possible at runtime. Alternatively, the compiler may operate as a translator for converting assembly code written for one machine to object for another machine, as set forth in copending applications Ser. No. 666,196, filed Mar. 7, 1991 by Richard L. Sites, for "Automatic Flowgraph Generation for Program Analysis and Translation", now pending, or Ser. No. 666,083, filed Mar. 7, 1991 by Thomas R. Benson, for "Use of Stack Depth to Identify Architecture and Calling Standard Dependencies in Machine Code", now pending. In either event, whether operating as a conventional compiler or as a code translator, the input code is first converted to an intermediate representation by doing a syntactical and lexical analysis, producing a stream of n-tuples or like data structures, where each tuple represents in intermediate language a primitive operation. A symbol table is also generated for all references to variables, labels, subroutines, etc. A flow graph is generated using the tuple stream and the symbol table, where the program is broken into blocks, with each block being a section of linear code with an entry at the beginning and exits (branch, etc.) at the end. The blocks are connected to form a representation of the program as written, in the flow graph. This intermediate language expression of the program is updated, annotated, and rearranged by the compiler to generate an improved representation of the program, using various optimization techniques, then a code generator produces object code from the intermediate representation as it has been optimized. At some point in this process, either before or after generation of the object code, actual register and memory references are substituted for the generic references used in the source code.

Most modern computers contain a form of high performance memory elements, called registers, that need to be used effectively to achieve high performance at runtime. The process of choosing language elements to allocate to registers and the data movement required to use them is called "register allocation." Register allocation has a major impact on the ultimate quality and performance of the code. A poor allocation can degrade both code size and runtime performance. The performance penalty caused by using a memory reference instead of a register reference, even for a processor using hierarchical memory with high speed cache, is perhaps several cycles, on average. The object, then, is to allocate the register usage so that a maximum amount of the code involves manipulation of operands in registers and that data movement between registers and lower levels of the memory hierarchy is minimized.

However, finding a truly optimal solution has been proven to be computationally intractable. Two general approaches to global register allocation are the bin packing method and the graph coloring method. Register allocation by graph coloring was described by Chaitin et al in Computer Languages, Vol. 6, pp 47–57, and in U.S. Pat. No. 4,571,678 to Chaitin for "Register Allocation and Spilling via Graph Coloring". While graph coloring uses an n-squared algorithm to find a "good" solution (registers allocated for all quantities that need them) if one exists, the bin packing method uses a linear algorithm which runs faster but may miss some "good" solutions. It is the object of the present invention to obtain some register allocation solutions achievable with graph coloring, but using a method requiring less compiler execution time.

Allocation with lifetime holes as described herein is an improvement to one instance of the bin packing algorithm which allows a better register allocation by finding some of the "good" solutions not found by the standard bin packing algorithm, white retaining good compile time performance.

SUMMARY OF THE INVENTION

In accordance with one embodiment of the invention, there is provided an improved method for register allocation which utilizes holes in the lifetime of temporary values in an instruction flow, with these holes being allocated for temporaries that will fit into them. At any given time there may thus be registers available for holding temporary values that would otherwise be reserved for the temporaries in which the hole appeared.

As used in this description of the invention, a temporary or temporary item (as used in referring to a representation of a computer program) is a data item that requires storage in either a register or memory (or both). A temporary can be a program variable such as variable defined by the programmer (e.g., "i=5") or an array index, or can be a compiler variable used for storing the intermediate result of a complicated operation (e.g., in evaluating "i=5*x/y" the "5*x" may be calculated and temporarily stored then divided by y to produce the value of i).

Each temporary has a "lifetime" which is determined by its first execution-time use or creation and last execution-time use within a program unit. The lifetime is all the compiler-generated instructions in the program unit that can be executed between the first and last use of this temporary value. For temporaries whose first use occurs before the start of a loop and whose last use occurs in the body of the loop, it is necessary to extend the lifetime to the bottom of the loop; otherwise, the value will not be valid for all loop iterations. In general, the lifetime starts at the earliest point where storage is required and extends to the last point where storage must exist.

A "lifetime hole" for a temporary represents the time during a temporary's lifetime when a valid value need not be present in the allocated storage for correct execution of the program. For example, in a code segment where there are no uses of a variable between a use and a later store into the variable, no meaningful data is carried during that time, so this time period is a hole in the lifetime of the variable. In general, a lifetime hole immediately follows a use of a temporary and ends with a store into the temporary.

According to the invention, the temporaries in a code segment are identified, then the lifetime of each temporary is identified and recorded, using the flow graph of the code. Then the flow graph is used to find any holes in the lifetime of each temporary. Thereafter, upon register allocation, the holes are utilized for placement of other temporaries whose lifetimes fit in the holes.

BRIEF DESCRIPTION OF THE DRAWINGS

The novel features believed characteristic of the invention are set forth in the appended claims. The invention itself, however, as well as other features and advantages thereof, will be best understood by reference to the detailed description of specific embodiments which follows, when read in conjunction with the accompanying drawings, wherein:

DETAILED DESCRIPTION OF SPECIFIC EMBODIMENT

Figure 1:
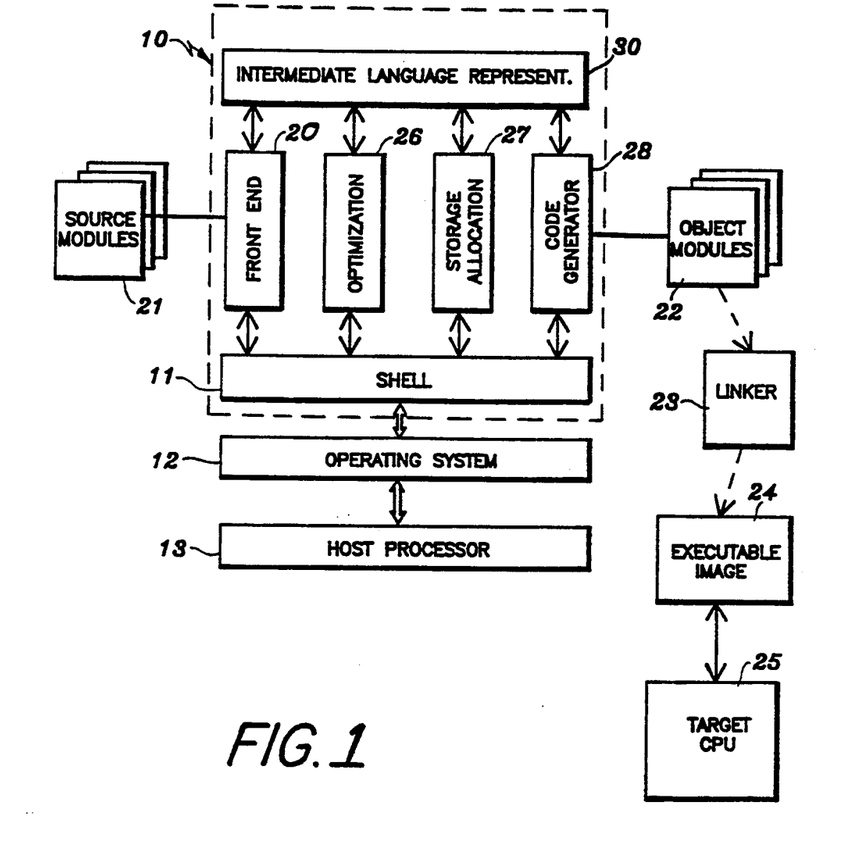
FIG. 1 is a diagram of compiler in which the lifetimes holes register allocation of the invention may be utilized.
Figure 2:
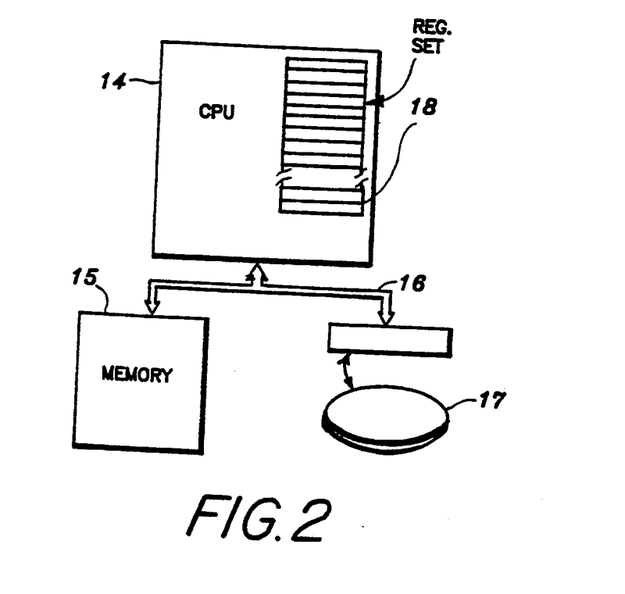
FIG. 2 is a block diagram of computer system which may execute the compiler of FIG. 1 or execute the code generated in the compiler.

Referring to FIG. 1, a register allocation method which may employ features of the invention is embedded in a compiler or code translator 10. This compiler may include an operating system interface or shell 11, as well as a front end for converting the input code to an intermediate language and a back end for optimizing the expression of the program and then emitting or generating the object code, as is the usual practice. The shell 11 operates under an operating system 12 (such as VAX/VMS, Unix, etc.) executing on a host computer 13 as seen in FIG. 2, the host typically including a CPU 14 coupled to a main memory 15 by a system bus 16, and coupled to disk storage 17 by an I/O controller; the CPU typically contains a register set 18. The compiler functions to convert code written in a first language to object code or code in a second language. A traditional compiler would convert a high level source code such as FORTRAN, for example, to object code for a specific machine, such as a VAX machine. A translator of the type disclosed in application Ser. No. 666,196 would convert code written for one machine architecture, e.g., VAX/VMS assembly language or object code, into object code for a different target architecture, e.g., an advanced 64-bit RISC architecture. In either event, the function of register allocation as herein described is a part of the compile operation.

The front end converter 20 is the main component of the compiler 10 which interfaces with the input language being compiled. This input language is that used in the file or files (module or modules) 21 which define the program unit of interest, the input of the compiler. The front end converter 20 performs a number of functions. First, it calls the shell 11 to obtain command line information entered by the user (person operating the host computer 13 of FIG. 2). Second, the front end 20 calls the shell 11 to control the listing file, write diagnostic messages, and the like, as is usual for compilers. Third, the front end 20 does lexical, syntactic, and semantic analysis to translate the code of the input file 21 to an internal representation used for the interface between the front end and the back end. Fourth, the shell 11 invokes the back end (remaining parts of the compiler) to generate object code modules 22 from the information in the internal representation. Not included in the compiler 10 of FIG. 1 is a linker 23 which links the object code modules or images 22 (with runtime library, etc.) to form an executable image 24 to run on the target machine 25.

The target machine 25 for which the back end of the compiler 10 creates code is a computer (generally of the form of FIG. 2) of some specific architecture, i.e., it has a register set 18 of some specific number and data width, the logic executes a specific instruction set, specific addressing modes are available, etc. Examples are (1) a VAX architecture as set forth in Levy and Eckhouse, "Computer Programming and Architecture: The VAX", 2d Ed., Digital Press, 1989, having sixteen registers in its register set, (2) a RISC type of architecture based upon the 32-bit RISC chip available from MIPS, Inc., as part number R2000 or R3000 and described by Lane in "MIPS R2000 RISC Architecture", Prentice-Hall, 1987, and (3) an advanced RISC architecture with 64-bit registers as described in copending application Ser. No. 547,589, filed Jun. 29, 1990. Various other architectures could be likewise accommodated, employing features of the invention.

In general, the front end converter 20 need not consider the architecture of the target machine 25 upon which the object code 22 will be executed, when the front end 20 is translating from source code 21 to the internal representation, since the internal representation is generic, independent of the target machine 25 architecture.

The back end of the compiler 10 functions generally to translate the internal representation constructed by the front end 20 into target system object code modules 22. To this end, the back end performs the basic functions of optimization 26, register and storage allocation 27, and code generation and object file emission 28. The optimization function of this embodiment is thus performed on the code when it is in its internal representation.

When the user (that is, a programmer at a console operating the computer system of FIG. 2, where the computer system is executing the operating system 12) invokes the compiler of FIG. 1, the shell 11 receives control and invokes the front end converter 20 to begin compiling an input stream from input module 21. The front end 20 parses the input code 21 and generates an intermediate language version of the program expressed in the input code. This intermediate language version is stored in intermediate language tables 30 (including a symbol table), which are later updated and rearranged by the stages 26, 27 of the compile functions as will be described. In one embodiment, a generic intermediate language may be employed, using an elemental structure of intermediate language known as a tuple, also referred to as an "n-tuple" or a "triple". A tuple is an expression which in computer programming language performs one operation. For example, referring to FIG. 3, an expression which might be written in a high level computer language as $I = J + 1$ would appear in VAX assembly-language as

ADDL3 #1,J,I that is, add "1" to the contents of memory location J and place the result in storage location I. If this code is translated into object code for a target machine in an efficient form that retains values in registers whenever useful for other references, makes maximum use of register-to-register arithmetic, it may appear as

| LOAD Rn, J | Load memory location J to Register N |
| --- | --- |
| . | |
| . | |
| ADD Rn, #1 | Add constant 1 to Register N |
| . | |
| . | |
| STORE Rn, I | Store Register N to memory location I |

Other instructions may be in the intervals between the LOAD and ADD or between ADD and STORE. The LOAD and STORE instructions occur at the first use of J and the last use of I, to make optimum use of the registers and to minimize memory operations. In intermediate language (abbreviated "IL"), however, the code is in a more elemental (and generic) form, and in one example would include six tuples, these being numbered $1, $2, $3, $4, $5 and $6 in FIG. 3; here the intervening instructions are left out. This way of expressing the code in IL includes a tuple $2 which is a fetch represented by an item 31, with the object of the fetch being a reference to symbol J, shown in tuple $1. The next tuple is a literal, item 32, making reference to the constant "1." The next tuple, item 33, is symbol reference to "I", which will be the target of the addition operator. The next tuple is an Add, item 34, which makes reference to the source tuples $2 and $3, followed by a Store tuple making reference to the Add tuple and to the destination tuple $4. A tuple may have one, two or three operand references, in one example.

Figure 3:
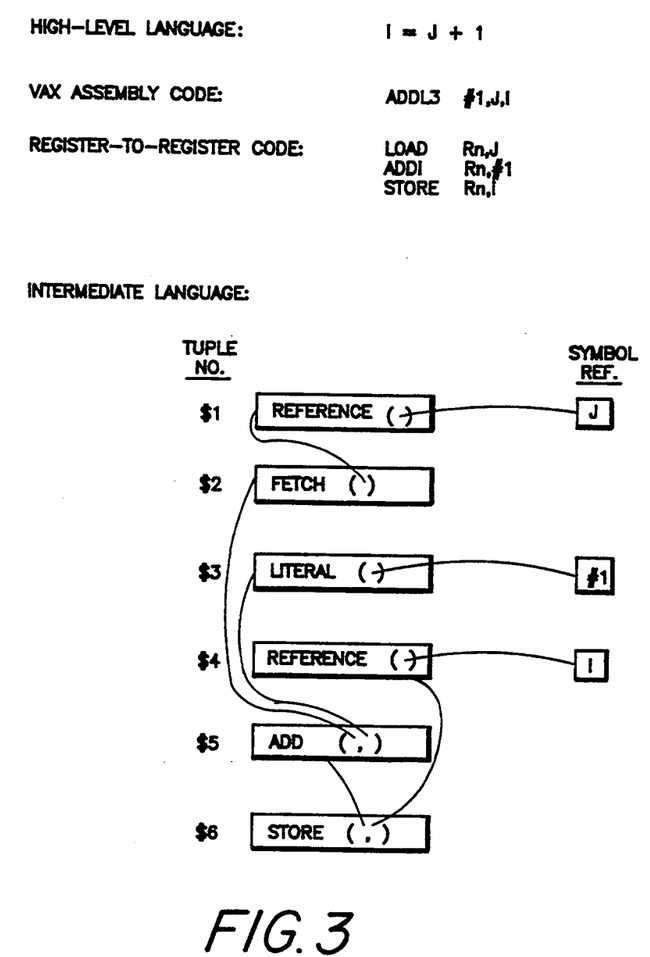
FIG. 3 is a diagram of a segment of code as it may be expressed in source code, assembly language and the tuples of intermediate language of the compiler of FIG. 1.
Figure 4:
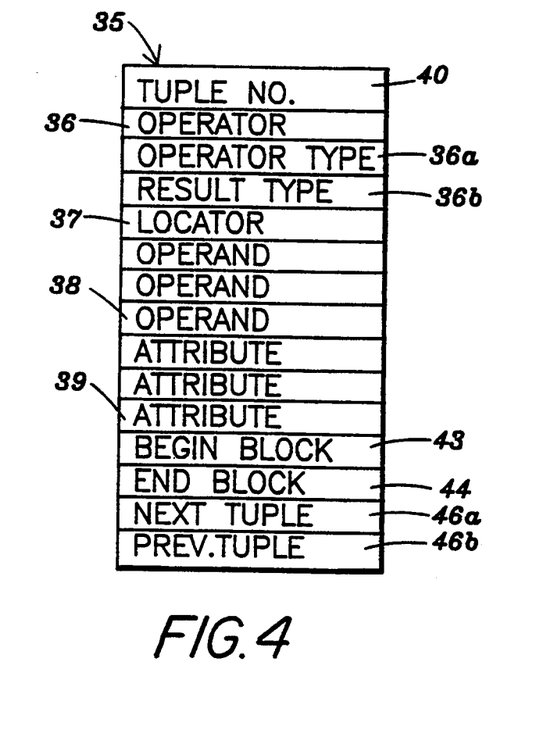
FIG. 4 is a diagram of a data structure used for an intermediate language tuple in the compiler of FIG. 1.

A tuple, then, is used to form the elemental expression of a computer program, and in the form used in one embodiment is a data structure 35 which contains at least the elements set forth in FIG. 4, including (1) an operator field 36, e.g., Fetch, Store, Add, etc., (2) a locator 37 for defining where in the input module 21 the input-code equivalent to the tuple is located, (3) operand pointers 38 to other tuples, to literal nodes or symbol nodes, such as the pointers to I and in tuples $4 and $3 in FIG. 3. A tuple also has attribute fields 39, which may include, for example, Label, Conditional Branch, Argument (for Calls), or SymRef (a symbol in the symbol table). The tuple has a number field 20, representing the order of this tuple in the block and the number from the beginning of the program unit being compiled.

Figure 5:
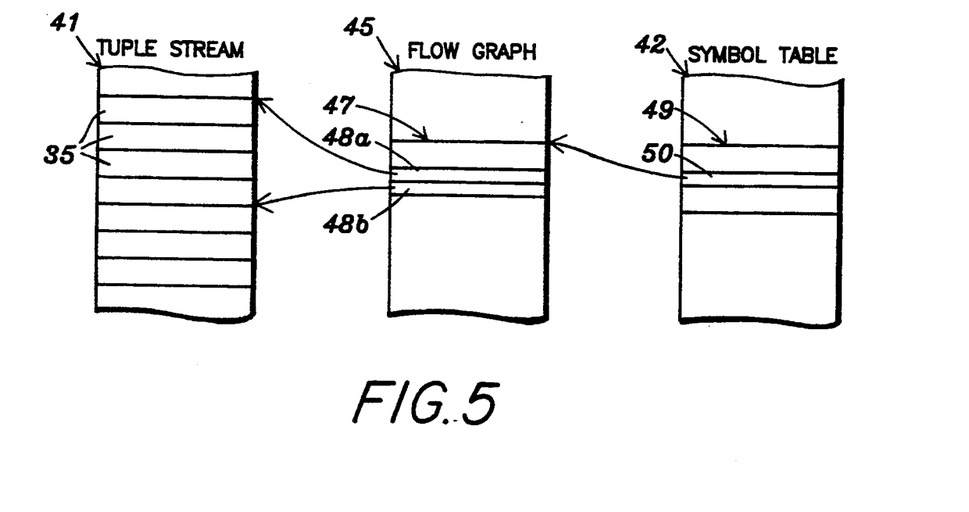
FIG. 5 is a diagram of the intermediate language tables used in the compiler of FIG. 1.

Referring to FIG. 5, the front end converter 20 parses the input code 21 to identify tuples to build an intermediate language tuple stream 41 made up of tuple data structures 35, and to build an associated symbol table 42. The next step, performed by a flow analyzer in the front end 40, is to scan the tuple stream 41 and identify basic blocks of code. A block of code (also called a node) is defined to be a sequence of tuples with no entry or exit between the first and last tuple. Usually a block starts with a label or routine entry and ends with a return or branch to another label. A task of the flow analyzer in the front end is to parse the input code 21 and identify the tuples and blocks. The tuple data structure 35 contains fields 43 and 44 that say whether or not this tuple is the beginning of a block, or the end of a block.

Figure 6:
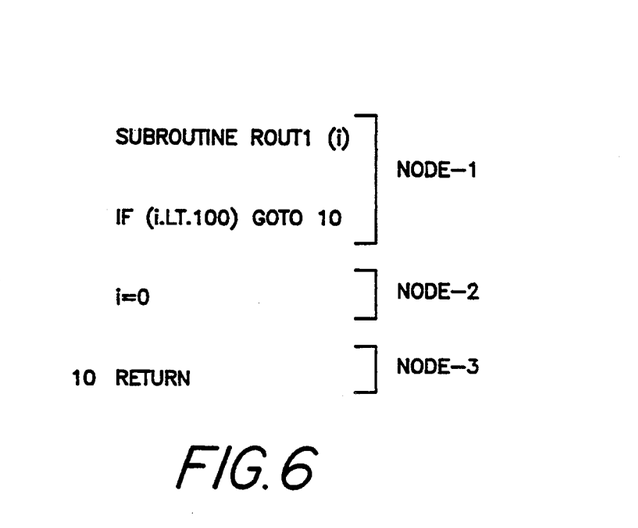
FIG. 6 is a diagram of an example of code to be processed by the flow analyzer in the compiler of FIG. 1.

Also seen in FIG. 5 is a flow graph 45 which is generated by the flow analyzer in the front end, as another part of the intermediate language tables 30. The flow graph 45 defines the basic blocks of the program, and edges which represent the flow between blocks. The flow graph is built by processing the tuples 35 created by the front end 20 of the compiler. The process of building the flow graph 45 by the flow analyzer includes walking the tuples of the tuple stream 41 sequentially for each program unit or section. Referring to the example code of FIG. 6, the flow analyzer adds tuples to the current flow block until one of the following is encountered, thus defining an edge when the previous block ends and a new block begins:

(a) a label - a branch to a label such as the "10 Return" statement will result in an edge being created to the node; hence, the label is the first tuple in the new Node-3 and it creates the edge which ends the current Node-1;

(b) a routine entry point (Rout1 (i), defining an edge of Node-1), which is treated like a label for purposes of flow—however, the routine entry has an additional symbol table entry Rout1 identifying it as a routine;

(c) a branch instruction - the branch GOTO 10 ends the current Node-1, and the next instruction i=0 begins a new node, Node-2;

(d) a return instruction, Node-3, which is treated like a branch instruction which branches to a special routine exit node.

A branch instruction such as the IF . . . GOTO of FIG. 6 results in an edge being created, linking the node (Node-1) containing the branch to the node (Node-3) containing the label which is the branch destination. If the branch is conditional, as here, an edge to the immediately following node (Node-2) will also be created, since flow may "fall through" to it. Indeed, an edge is a bidirectional link; the flow needs to be traceable in both forward and backward directions.

Accordingly, the intermediate language tables 30 used in the compiler of FIG. 1 include the tuple stream 41 and a symbol table 42, along with the flow graph 45. The primitive concept is the tuple, and the intermediate language flow graph 45 is made up to link the tuples into nodes or blocks representing the operations to be executed, each tuple 35 having a data structure as in FIG. 4. These tuples 35 within nodes are tied together by pointers which represent various relations. The most important relations are the operator-operand relation (a pointer 38 from an operator to each of its operands) and the linear ordering represented as a tuple number field 40 on all the tuples in each basic block of the intermediate language flow graph 45; the order of the tuples within a node encodes the execution order of the operations of the program.

As mentioned in reference to FIG. 4, in one embodiment each tuple 35 has various fields, including the following:

(a) Generic operator 36 - identifying the general operation performed by the tuple, e.g., ADD, FETCH, etc.

(b) Operator type 36a - a data type which, normally, determines the specific operation performed by the tuple. The operator data type is primarily of interest only on data fetch or storage tuples. Instruction tuples are by definition self-contained, and will not be referenced in later instructions; hence, their data type is null.

(c) Result type 36b - the data type of the value computed by this tuple.

(d) Operands 38 - an array of pointers to the operands of this tuple. The number of operands is determined by the generic operator. Each operand pointer 38 points to another intermediate language tuple, or, in some cases, to a symbol or literal node in the symbol table as in tuples $1, $3 and $4 of FIG. 3.

(e) Next/Prev tuple 46a and 46b - pointers to the next and previous tuples in a doubly-linked list of tuples. The next tuple order is the implicit order of execution of the operations in the node.

(f) Locator 37 - the textual location in the input module 21, i.e., in the program source of the token or tokens which are compiled in this tuple. The locator is used in constructing error messages, source correlation tables, etc.

Some types of tuples have additional fields, known as attributes 39. Instances of attributes in an embodiment of FIG. 1 may include:

(a) Reference attributes, which point to nodes in the symbol table 42. These are always present in LITREF, SYMREE LABEL and entry point tuples, pointing to literal nodes, symbol nodes, label nodes, and entry nodes, respectively.

(b) Instruction attributes, which are VAX instruction type constants. These are present in INSTR (instruction) and CONDBR (conditional branch) tuples, and further specify the instruction or branch operation.

(c) Register attributes, which are simply register numbers specified in REGREF (register reference) tuples, such as after registers are assigned.

Other additional private fields may be introduced into the tuple structures by the analyzer or code generator; these include such things as condition code flags and many others, depending upon the optimizations being run, etc.

The flow graph 45 is a component of the intermediate representation, and is constructed and used by the flow analyzer, then later traversed, annotated and updated by the optimizer 26, the storage allocator 27 and code generator 28. The tuples 35 for a particular routine or program (or input module 21) are in the tuple stream 41, linked by pointers 38, 46a, 46b, and having blocks or nodes defined by fields 43, 44. The flow graph 45 identifies the nodes or blocks 47 by pointers 48a and 48b to the beginning and ending tuples 35 for this block in the tuple stream 41. Since routines, labels, etc., will have entries in the symbol table 42, the symbol table is a reference point for tracing the program, i.e., finding the blocks and their ordering. The flow graph of the code of FIG. 6 may be illustrated as in FIG. 7, where it is seen that there are two paths from Node-1, that is, to Node-3 via Node-2 if the conditional branch fails, or directly to Node-3 if the branch is taken.

Figure 7:
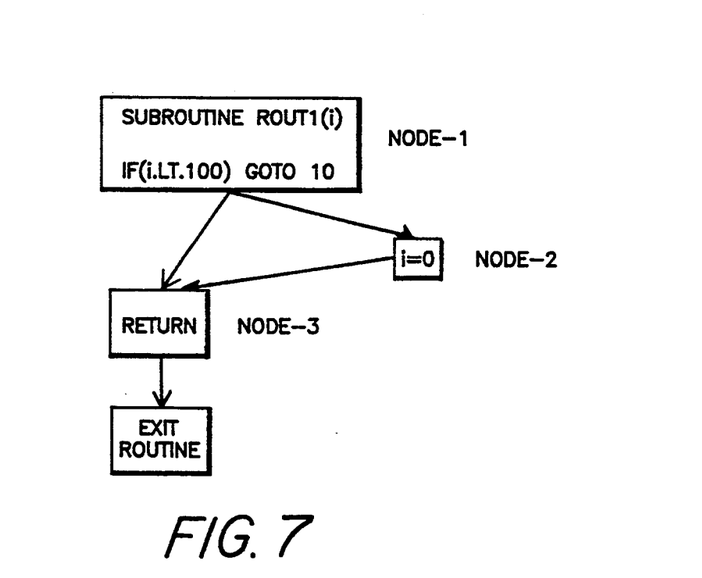
FIG. 7 is a diagram of a flow graph of the code segment of FIG. 6.

A routine such as that of FIG. 7 has an entry or node 49 in the symbol table 42 as seen in FIG. 5 which includes a pointer 50 to the flow node 47 in the flow graph 45, and this node 47 includes pointers 48a and 48b to the beginning and ending tuple of this node in the tuple stream 41. Each flow node 47 has use and definition vectors for the temporaries. Each temporary in the program unit is assigned one bit in the use and definition bit vectors. For each flow node, the definition bit for a temporary is turned on if the temporary is assigned a new value during the flow node. Likewise, the use bit for a temporary is turned on if the value of the temporary is used within the flow node. Finally, the use bits are propagated backwards through the flow graph to flow nodes which do not have the definition bit set and have a successor flow node with the use bit set. Propagating the use and definition bits around the flow graph to perform global data flow analysis is a solved problem; see Aho and Ullman, *Principles of Compiler Design*, Sec. 12.5. Each flow node 47 also has a number of other fields, e.g., for stack usage, register usage and condition code usage. The symbol table also contains entries for symbols in the usual sense.

Figure 8:
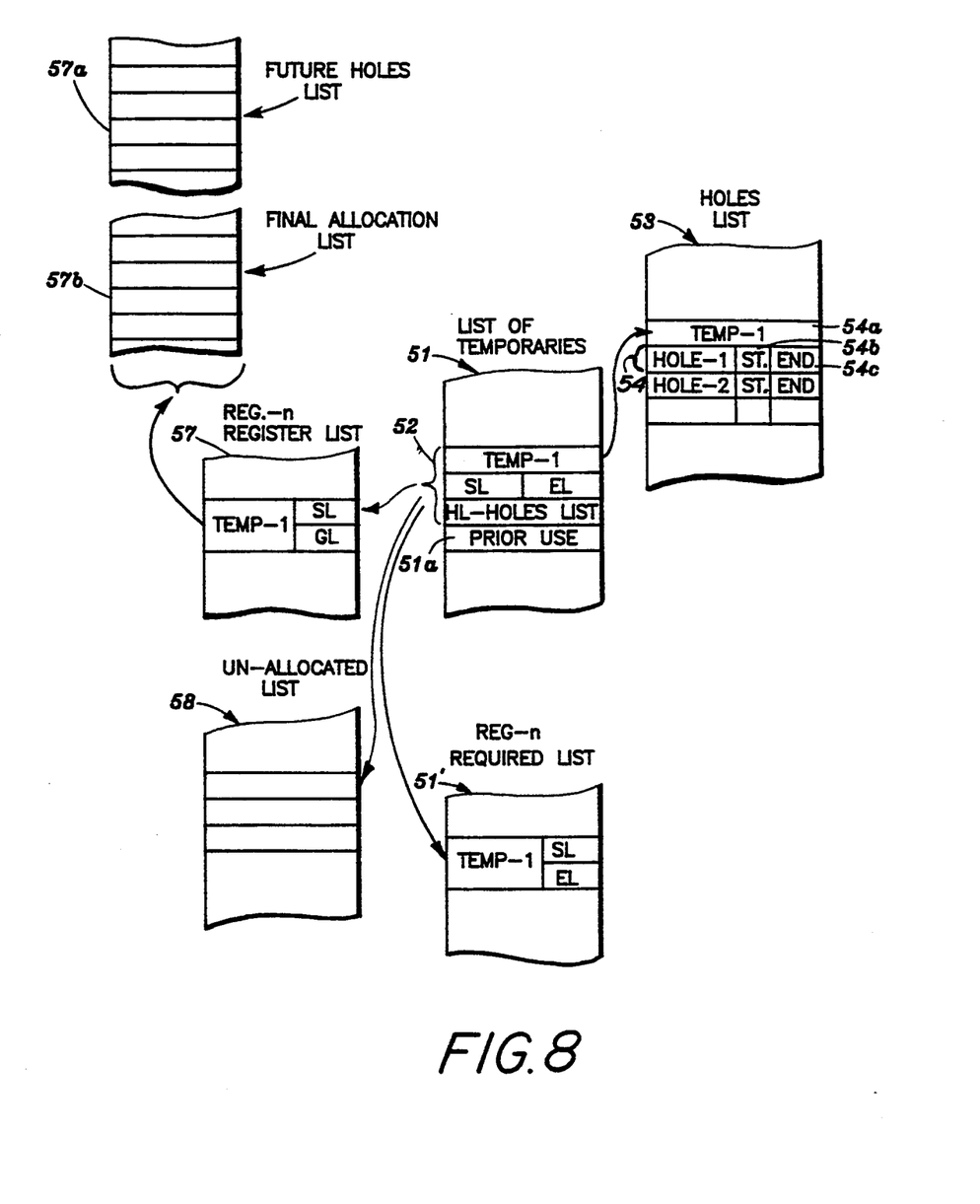
FIG. 8 is a diagram of data structures used in the register allocation method of the invention, according to one embodiment.

According to the invention, the temporaries are identified by traversing the tuples 35 and noting the items which require storage, such as I, J and #1 in the program unit of FIG. 3. The "lifetime" for each temporary is determined by finding its first execution-time use and last execution-time use within a program unit, again by traversing the tuple stream. As noted above, the lifetime starts at the earliest point where storage is required and extends to the last point where storage must exist. A list 51 of temporaries is generated for a program unit, illustrated in FIG. 8, where there is an entry 52, for each temporary. This list 51 is sorted by starting lifetime, so the first-used temporary will be an entry 52 at the top of the list, followed by entries 52 for the next-used, etc. Thus each entry 52, will have a field SL for starting lifetime, and also will have a field EL for ending lifetime. A list 53 of holes in the lifetime of each temporary is maintained as seen in FIG. 8; there is a holes list 53 for each temporary, and the entry 52 has a pointer HL to the holes list for this temporary. The holes list 53 has a field 54a identifying the temporary and an entry 54 for each hole, with fields 54b and 54c giving the starting and ending points (tuple numbers 40) for each hole.

A "lifetime hole" represents the time during a temporary's lifetime when a valid value need not be present for correct execution of the program. For example, in the code segment of FIG. 9, the lifetime 55 of variable i extends over the entire loop. However, because there are no uses of i between the test at the top of the loop and the store into i at the bottom of the loop, no meaningful data is carried in i during that time. This time period 55a is a hole in the lifetime of i. In general, a lifetime hole immediately follows a use of a temporary and ends with a store into the temporary.

Figure 9:
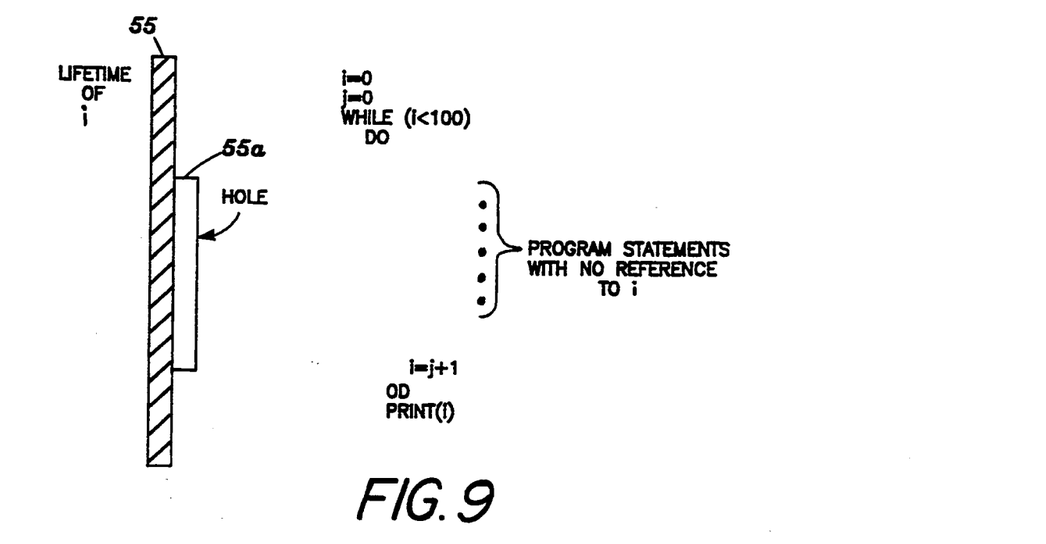
FIG. 9 is a diagram of a segment of code and the lifetime of a temporary illustrated by this code, showing in addition a lifetime hole.
Figure 10:
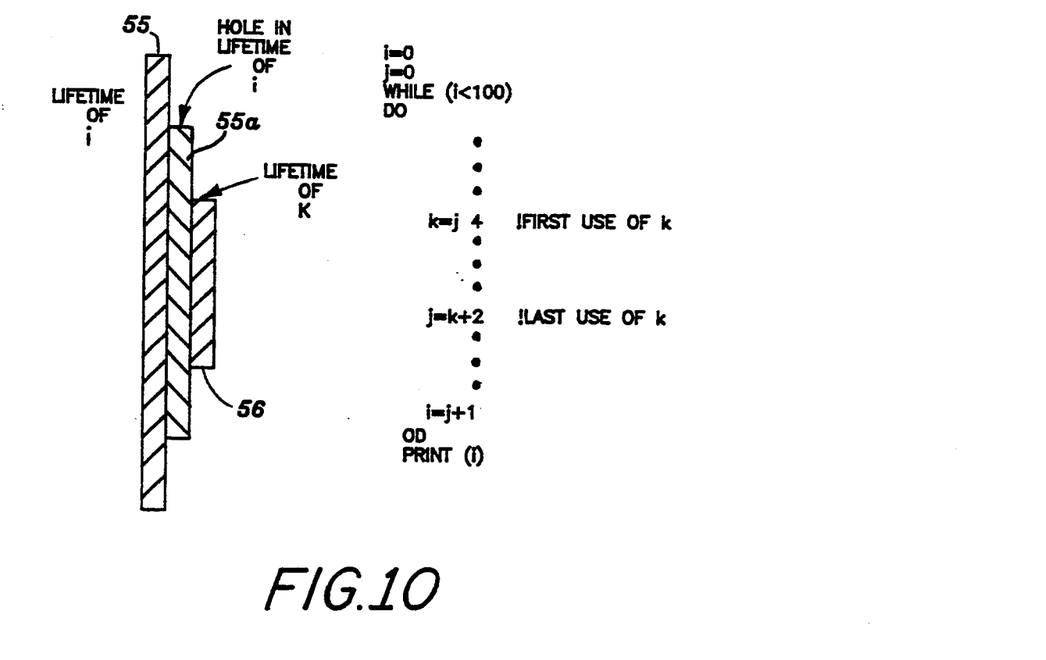
FIG. 10 is a diagram of a modification of the segment of code as in FIG. 9, showing another temporary allocated in the hole.

The purpose of the treatment of lifetime holes as herein set forth is to improve the quality of the code generated by a compiler. By taking advantage of lifetime holes, it is possible to keep more temporaries in registers than previous methods. If the example of FIG. 9 is changed slightly by adding a variable k whose lifetime 56 is contained within the loop, as seen in FIG. 10, the optimization becomes clear. Previously, if it was desired to allocate both i and k to registers, it would have been necessary to use two different registers since it is impossible for a register to hold more than one value at a time. However, in the example of FIG. 10, because the lifetime 56 of k fits entirely within the hole 55a in the lifetime 55 of i, both i and k can be allocated to the same register. With more temporaries allocated to registers, fewer memory operations are required, improving run time performances and reducing code size.

Prior to register allocation, certain data structures are generated such as those of FIG. 8. First the lifetime of each temporary is calculated and recorded in entry 52, and any lifetime holes identified and entries 54 made in the holes list 53, by traversing the flow graph 45 in a forward direction and identifying each reference to a temporary. A list 51 of temporaries is generated as a data structure as shown in FIG. 8. All lifetime holes found in the lifetime of a given temporary are put on the list 53 of FIG. 8 in fields 54 in the data structure associated with that temporary. All temporaries placed on the list 51 of FIG. 8 are sorted by starting lifetime. Finally, if a temporary must be allocated to a specific register, then it is also placed on another list 51' of FIG. 8 which is associated with the required register. There is a list 51' for each register defined by the architecture. For the VAX architecture there are thirteen registers available for allocation, since three of the sixteen registers are assigned specific tasks, such as stack pointer, etc. The register-specific lists 51' are also sorted by starting lifetime and are used as a look-ahead by the allocator 27 to avoid conflicts. These lists 51 and 51' form the main input to the register allocator 27.

Figure 11:
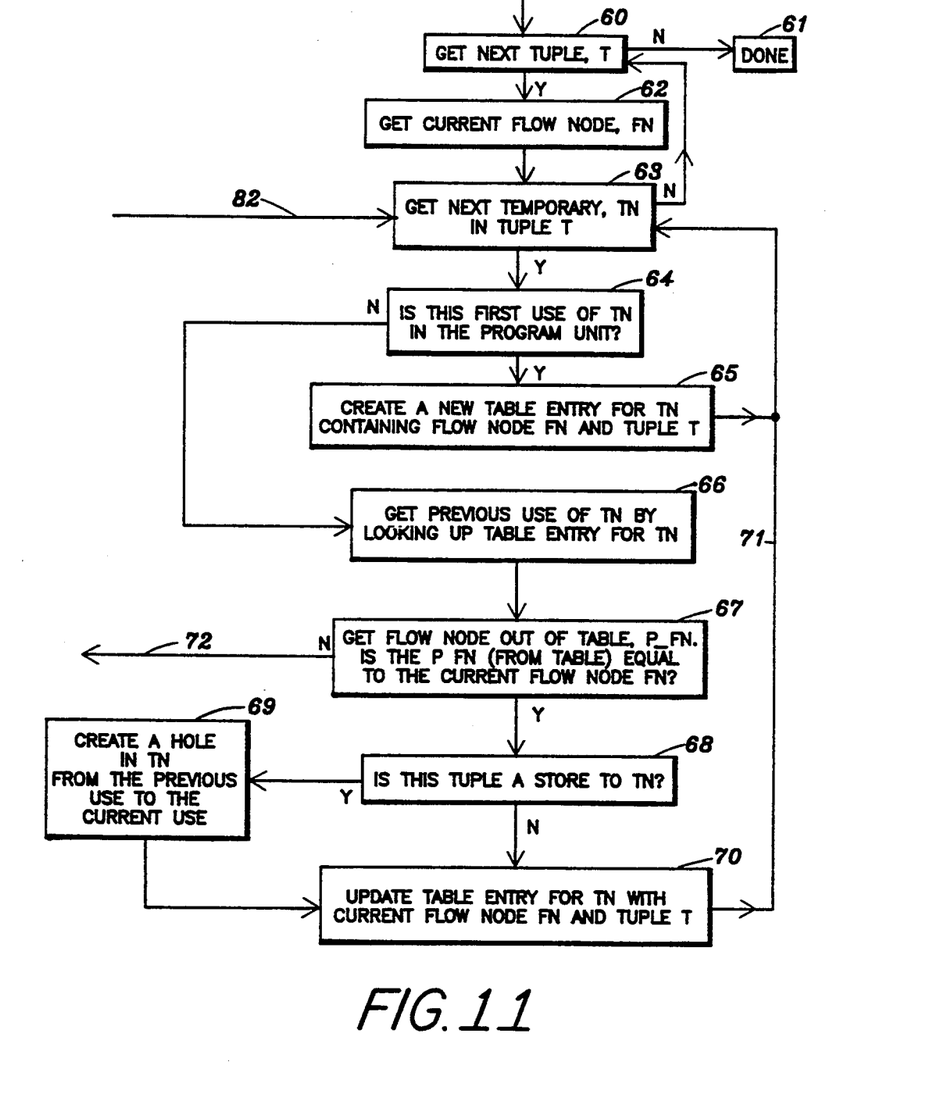
FIGS. 11 and 12 are two parts of a logic flow chart for a method of finding lifetime holes according to one embodiment of the invention.
Figure 12:
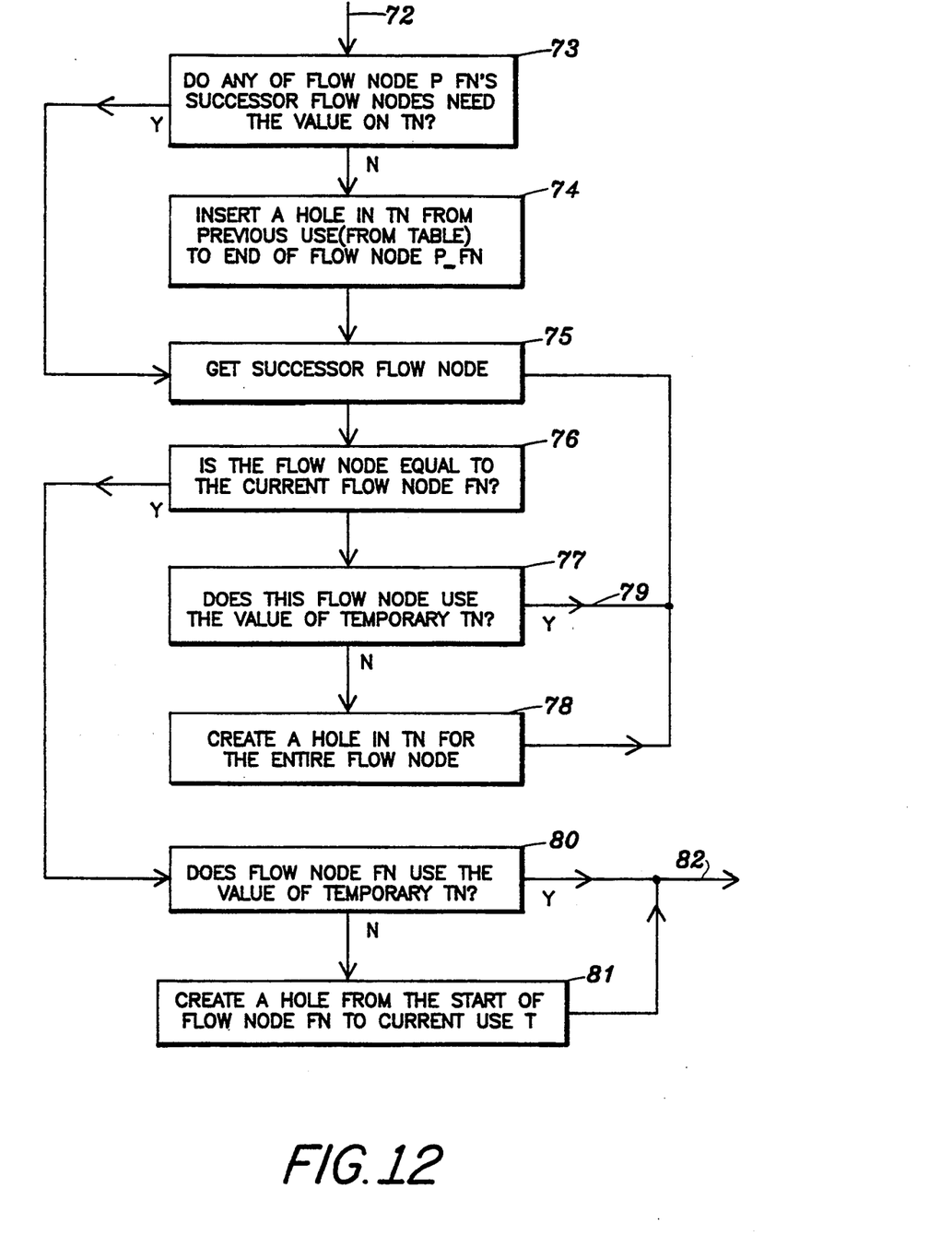

An algorithm for identifying lifetime holes in a temporary, according to one embodiment of the invention, will be described later. The algorithm is also illustrated in FIGS. 11-12. A summary of the method is: As the compiler 10 makes the forward pass over the internal representation of the program as referred to above, it keeps track of the last use of each temporary by updating the EL field of the entry 52. When it comes to a new use of a temporary, it tries to insert holes between the last use and the current use. The rules for inserting a hole are:

1) If the current use and the prior use are in the same flow block, there is a hole from the prior use to this use if and only if the current use is an assignment to the temporary (or other unconditional store.)
2) If the current use and the prior use are in different flow blocks, look at each block from the one containing the prior use forward through the one containing the current use.
   For the first block (containing the prior use):
      If no immediate successor blocks need the temporary's value, a hole exists starting at the prior use and continuing to the end of the block.
   For the last block (containing the current use):
      If the block does not need the temporary's value and the current use is an assignment to the temporary (or other unconditional store), a hole exists starting at the beginning of the block and ending at the current use.
   For the other blocks:
      If the block does not need the temporary's value, a hole exists for the entire block.

While proceeding through the blocks, keep track of a "current hole" in each temporary. If a block can have a hole, extend the current hole if it already exists, or else start a new one.

After the lifetime of each temporary has been defined, and holes identified, the register allocation is performed. One of the main inputs to the allocator 27 is the list 51 of all the temporaries sorted by starting lifetime SL. The allocator 27 takes the first temporary off the front of the list 51 and tries to allocate it to a register. If the allocation is successful, the temporary is placed on a register specific list 57. If the allocator is unsuccessful, the temporary is placed on an unallocated list 58. The allocator then processes the next temporary on the input list 51. The temporary which is currently being processed by the allocator is called the "candidate temporary." When a temporary is allocated to a register during a lifetime hole of another temporary, the new temporary is called a "nested temporary."

When the allocator 27 is trying to determine the "best" allocation it must be able to decide between temporaries to determine which temporary, when allocated a register, gives a faster overall execution. The allocator assigns relative weights to each temporary to help make this decision. In the method of one embodiment of this invention, each temporary is assigned a weight which is a function of the number of uses of the temporary in the program unit.

When the allocator decides that the candidate temporary is more valuable than a temporary previously allocated to a register, it must remove the earlier temporary from a list 57 to make space for the candidate temporary. The candidate temporary "kicks out" a previously allocated temporary.

Data Structures for Register Allocation:

There are several data structures used during register allocation. For each register Rn there are three lists: a current list 57, a future holes list 57a, and a final allocation list 57b, as seen in FIG. 8. The current list 57 for a given register is a stack of all the temporaries and holes allocated to that register whose lifetimes are still active. When a temporary or hole is allocated to a register it is pushed onto the current list 57, and when its lifetime expires, it gets popped of the current list 57. When a temporary is popped off a current list 57, it gets a place on the final allocation list 57b paired with the current list 57. When holes are popped off a current list, they are thrown away. When trying to determine whether the candidate temporary is more valuable than the temporaries already allocated to register Rn, the decision is made by comparing the candidate temporary with the temporaries on the current list Rn. When a temporary is pushed on current list 57, it might have a list of holes in the temporary's lifetime. Because each hole cannot be pushed onto the current list until its lifetime is active, these holes must be kept on another list until their lifetime becomes active and they can be pushed on the current list. The future holes list 57a consists of all the known holes (found previously) that cannot yet be pushed onto the current list because their lifetimes are not yet active. The future holes list 57a is implemented as a singly linked list. The final allocation list 57b is implemented as a doubly linked list. The final allocation list 57b is unnecessary for a single pass allocator but is useful for debugging and internal consistency checking.

The algorithms for allocating by lifetime holes, according to one embodiment, are explained in the following paragraphs, and also set forth in a flow graph of FIGS. 13-14 which will be described below.

Rules for pushing an item on a current list 57:

1) Temporaries can only be pushed on top of holes. If a temporary pushed on a current list 57 for register Rn, has a list 53 of holes associated with it, the holes are added to the front of the future holes list 57a for register Rn.

2) Holes can only be pushed on top of their associated temporaries. If a hole on the future holes list 57a for register Rn becomes active and can be moved to current list 57 for register Rn, the temporary on the top of the current list 57 for register Rn has to be the temporary with the lifetime in which the hole was found.

Rules for popping items with expired lifetimes off a current list 57:

1) If the top item is a temporary
  A) Move the temporary to the final allocation 57b
  B) Update the hole under the temporary
    1) Remove the section of the hole starting at the beginning of the hole's lifetime and ending at the beginning of the temporary's lifetime (may be of length zero).
    2) Update the hole's lifetime to begin at the end of the temporary's lifetime.
2) If the top item is a hole, remove the hole from the current list 57 and throw it away.

Rules for kicking items off the current list 57 (when allocating a new temporary is better than the existing allocation):

1) If the top item is a hole remove the hole from the current list 57 and throw it away.
2) If top item is a temporary, move it to the unallocated 58 list and remove all associated holes from the front of the future holes list 57a Rules for allocating temporaries to registers:

1) Check top of each current list 57, popping off items whose lifetime has expired.
2) Check each future holes list 57a to see if any new holes can be pushed on a current list.
3) Compute conflicts.
3) Choose best allocation.
  A) If the best allocation is a register and there is a hole big enough on the current list 57, push the temporary on the current stack.
  B) If the best allocation is a register and there is not a hole big enough on top of the stack, kick out items until there is a hole big enough on top and then push the temporary.
  C) If the best allocation is in memory, put temporary on the unallocated list 58.

The method for finding lifetime holes is illustrated in flow chart form in FIGS. 11-12. The inputs to this method are (1) the flow graph 45, there being use and definition information for each temporary for each flow node or block, (2) the intermediate representation in tuples, and (3) the prior use list 51a containing the tuple and the flow node for the prior use of each temporary. The first control block 60 represents the function of getting the next tuple, or, if there are no more tuples, it exits to "done" at item 61. If a tuple is fetched, the next step is to get the current flow node 47, referred to as FN, at item 62. All tuples have a flow node, so the next step is always to get the next temporary in the tuple, i.e., from the operands 38, at item 63. If there are no more temporaries in this tuple 35, control returns to item 60 to get another tuple. If another temporary is found, there is a check at item 64 to see if this is the first use of the fetched temporary in the program unit, by referring to the prior use list 51a, and, if so, a new entry in list 51a for this temporary is created at item 65, and control returned to item 63 to get another temporary. If this is not the first use of the temporary, control goes to item 66 to get the previous use of this temporary by looking up the table entry in prior use list 51a for the temporary. At 66 the tuple containing the prior use P_T is fetched from the prior use list 51a. Next, the flow node is fetched from the prior use list 51a for the previous use, P_FN, and this P_FN from the list 51a is checked to see if it is equal to the current flow node FN, all in item 67. If so, the item 68 checks to see if this tuple is a store to the temporary TN, and, if so, a hole is created in the temporary from the previous use to the current use, recorded in list 53, indicated by the item 69, and the prior use list 51a entry for this temporary is updated at item 70 with the current flow node FN and tuple T. Or, if item 68 shows this is not a store, the table entry 52 is likewise updated at item 70, and in either event control returns to item 63 by path 71. If, in item 67, the previous flow node is not equal to the current flow node, control passes by path 72 to item 73 of FIG. 12. In item 73, a check is made to see if any of the P_FN's successor flow nodes need the value of the temporary, and, if not, a hole is inserted in the holes list 53 for the temporary from the previous use (from prior use list 51a) to the end of flow node P_FN, in item 74. From either item 73 (yes) or item 74, control goes to item 75 where the next successor flow node 47 is fetched, then checked in item 76 to see if this successor flow node is the current flow node. If not, in item 77 a check is made to see if this flow node uses the value of the temporary TN, and, if not, a hole is created in the holes list 53 for the temporary for the entire flow node, at item 78, and control returns to item 75 to get another successor flow node. If this flow node does use the temporary TN, control returns by path 79 to item 75 to get a successor flow node. When, in item 76, it is found that the flow node is equal to the current flow node, the control passes to item 80 to check if the flow node FN uses the value of the temporary TN, and, if not, a hole is created (recorded in list 53) from the start of the flow node FN to the current use in this tuple T, as indicated by item 81. If, in item 80, it is found that the flow node does use TN, control goes by path 82 to item 63 of FIG. 11 to get the next temporary. Or, if a hole is created in item 81, the control likewise returns by path 82 to get the next temporary. This loop continues until all temporaries of the tuple are processed, and tuples are processed until the end of the program segment. The result will be an identification of all lifetime holes, recorded in the definition of temporaries by the holes lists 53.

Figure 13:
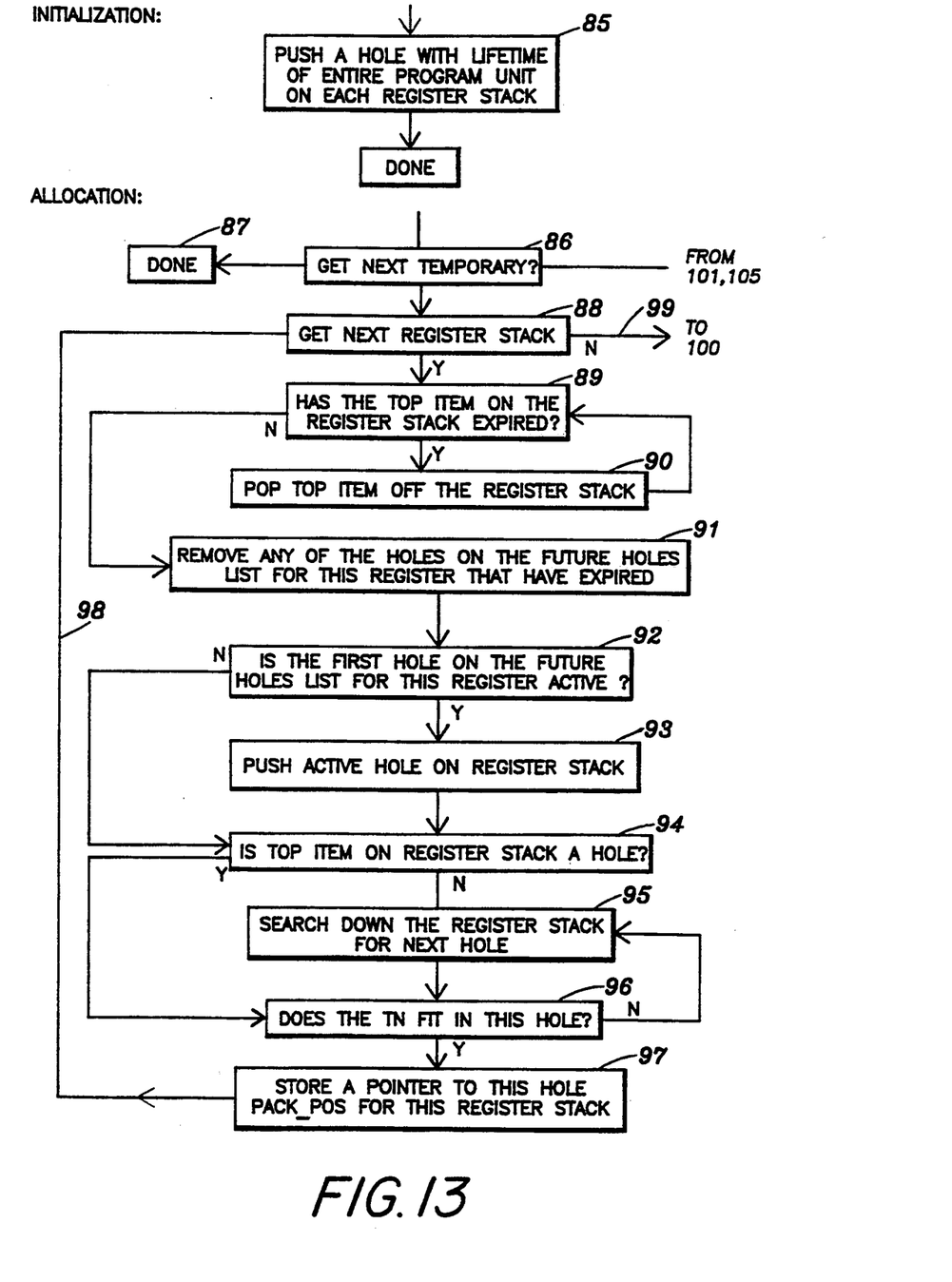
FIGS. 13 and 14 are two parts of a logic flow chart for a method of allocating registers using lifetime holes according to one embodiment of the invention.
Figure 14:
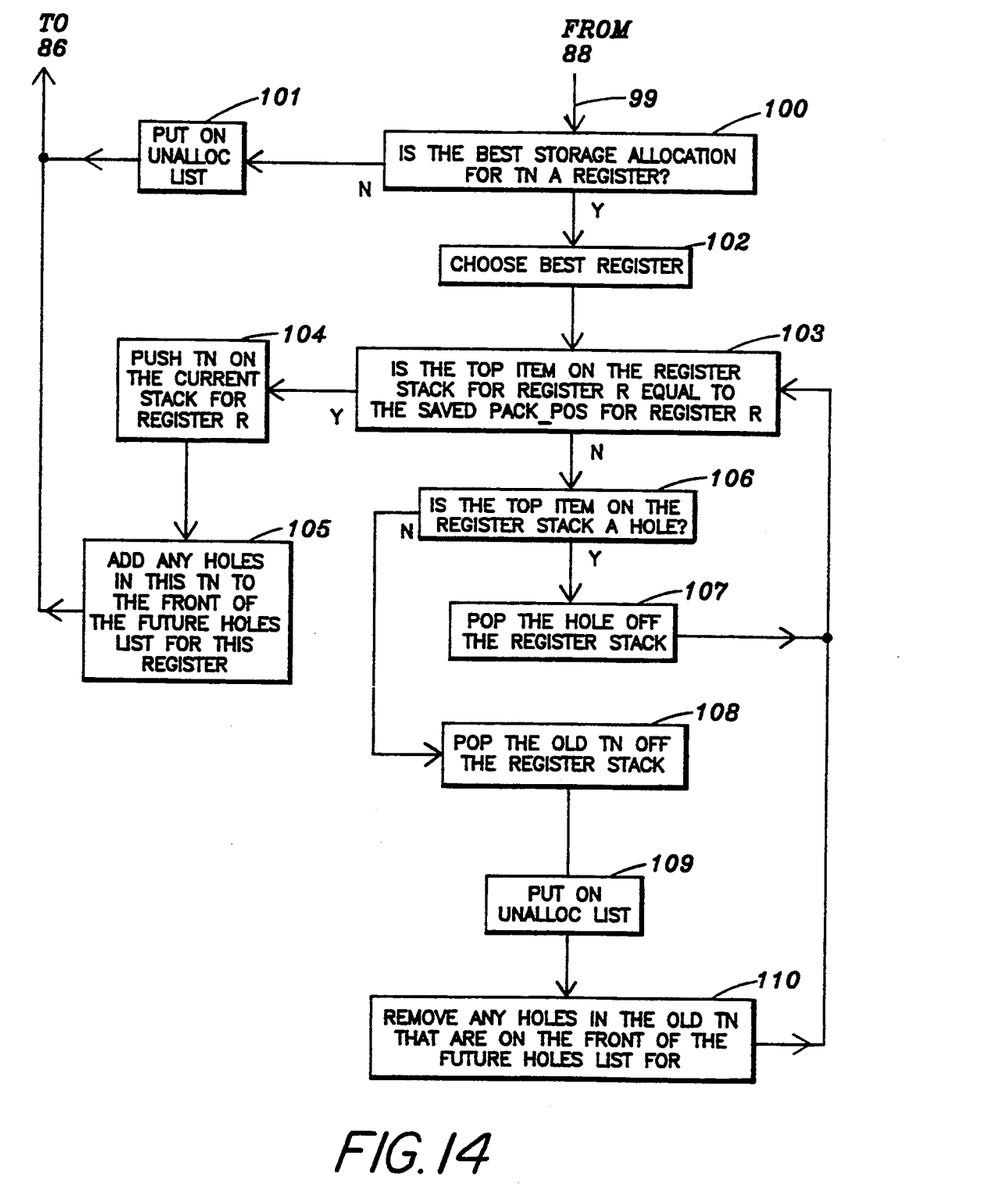

A method of register allocation using lifetime holes is illustrated in flow chart form in FIGS. 13-14, where the inputs are (1) the list 51 of temporaries sorted by starting lifetime, (2) a stack for each register 57, and (3) a list of future holes 57a for each register. The register stacks are initialized as indicated by item 85 by pushing a hole with a lifetime of the entire program unit on each register stack 57. The first step is to get the next temporary from list 51, at item 86, and if there are no more, the process is done, item 87. If there is another temporary, the next register stack 57 is fetched at item 88, and if there is another register stack it is checked at item 89 to see if the top item has expired. If so, the top item on the stack is popped, at item 90, and control returned to item 89 where the next item on the top of the current stack is checked. When all the expired items have been popped off the current stack control goes to item 91 to remove any of the holes on the future holes list 57a for this register that have expired. Next, at item 92, a check is made to see if the first hole on the future holes list 57a for this register is active. If so, an active hole is pushed on the register stack 57 in item 93 and control goes to item 94, or, if not, control goes directly to item 94. In item 94, a check is made to see if the top item in the register stack 57 is a hole, and, if not, a search is made down the register stack 57 for the next hole, at item 95. In either event, the hole is checked at item 96 to see if the temporary TN fits in this hole, and if not control returns to item 95 to find a hole in which TN will fit. After a hole is found, a pointer to this hole is stored at item 97, and control returned by path 98 to item 88 to get the next register stack 57. If all the register stacks are used, control goes by path 99 to item 100 in FIG. 14, where an evaluation is made of whether the best storage allocation of this temporary TN is a register. If not, then TN is allocated for storage in memory, item 101, by placing it on the unallocated list. If so, the best register R is chosen at item 102, then the top item on the register stack 57 for register R is checked in item 103 to see if it is equal to the saved Pack_Pos for register R. If so, then the TN is pushed on the current stack 57 for register R, at item 104, and any holes are added to this TN to the front of the future holes list 57a for this register, at item 105, before returning to the start 86 to get the next temporary. If the check at item 103 returns "no" then control passes to item 106 where a check is made to see if the top item on the register stack 57 is a hole, and, if so, then the hole is popped off the register stack at item 107. If not a hole, then control passes to item 108 where the old TN is popped off the register stack. The old Tn is then allocated to storage in memory at item 109, and any holes in the old TN that are on the front of the future holes list for this one are removed at item 110 before control is returned to item 103, where the check is again made. When the top item is the saved PACK_POS, the processing of this temporary is completed by items 104 and 105 and return to the start at item 86. In this manner all of the temporaries are allocated to a register final allocation list 57b or memory by placing on the unallocated list 58.

In addition to the lifetime holes optimization, a related optimization is register history. Register history is an optimization which removes unnecessary memory operations once the allocation of registers is known, thus reducing the code size and increasing program speed. If two temporaries contain the same data value, it may be possible to eliminate register loads if both temporaries are allocated to the same register.

A history candidate is a temporary which has been previously identified as a good candidate for the register history optimization. The allocator 27 tries to find a previously allocated temporary which has the same data value. If the allocator finds a previous temporary, it tries to use the same register for the history candidate.

A history parent is a previous temporary which calculates the same data value as the history candidate. If the history candidate is allocated the same register as its history parent, it may be possible to eliminate a register load. This is called history success.

Preferencing is the method by which the allocator can achieve history success in some cases. After the allocator finds the history parent, it preferences the history candidate to the same register. If the allocator must choose among several registers for the history candidate, it will choose the preferenced register.

For the lifetime holes optimization to work well, it preferably incorporates a method of achieving the register history optimization. History candidates are constrained to occur in two different scenarios. They must have either sequential non-overlapping lifetimes or nested lifetimes. For the first case, history success is achieved by preferencing the history candidate to its history parent. If both get the same register, the history is successful and a load can be eliminated. This case is easily incorporated into lifetime holes through a general register preferencing mechanism. Simple preferencing doesn't provide optimum results for the second case because of the conflicts associated with nested lifetimes. This problem is solved by the concept of a "history hole." When the allocator determines that it can successfully create a nested history allocation, a history hole is allocated to the register containing the history parent.

In addition to providing a good register allocation, the lifetime holes optimization provides other benefits. The lifetime holes algorithm allows the register allocator to be more rigorous in its internal consistency checking than was possible previously. By checking the integrity of the current stack while pushing, popping, or kicking, it is very easy to detect allocation errors at compile time. This decreases the possibility of generating an incorrect register allocation. Lifetime holes also provides an easy way to run the bin packing algorithm several times. After each pass, the final allocation approaches the solution found by graph coloring.

While this invention has been described with reference to specific embodiments, this description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A method of allocating registers in a compiler, comprising the steps of:
 a) identifying temporary items in a unit of code, each of said temporary items requiring storage;
 b) identifying a lifetime of each one of said temporary items, said lifetime of said each of said temporary items being an interval of time between the creation and the last use of said each of said temporary items within said unit of code;
 c) identifying holes in the lifetime of said each one of said temporary items, said hole in the lifetime of said each one of said temporary items being an interval of time between a use and store of said each one of said temporary items within said unit of code; and
 d) allocating to said registers said each of said temporary items, including forming a list for each of said registers of said each of said temporary items and said holes associated with said each of said temporary items allocated to said each of said registers;

allocating to one of said registers a first one of said temporary items, said first temporary item having a hole;

locating in said list a second one of said temporary items, said second temporary item having a lifetime fitting within said hole in said first temporary item; and allocating to said one register said second temporary item.

2. A method according to claim 1 including the step of making a list of said temporary items sorted by starting lifetime wherein said each of said temporary items are allocated to registers in the order said temporary items appear in said temporary items list.

3. A method according to claim 1 including the steps of converting an input code into an intermediate language expressed as an ordered list of tuples, and from said list creating a flow graph of said unit of code.

4. A method according to claim 1 wherein there are a number of said registers as defined by an architecture of a computer which is to execute object code generated by said compiler, and the method includes the steps of:

making a list of said temporary items sorted by starting lifetime, wherein said each of said temporary items are allocated in the order in which said temporary items appear in said temporary items list; and forming a list for a selected one of said registers of ones of said temporary items assigned to said one register and holes in lifetimes of said ones of said temporary items, using said lists of temporary items, wherein said allocating said second temporary item uses said list of temporary items assigned to said selected register.

5. A method according to claim 4 including the steps of converting an input code into an intermediate language expressed as an ordered list of tuples, and from said list of tuples creating a flow graph of said unit of code.

6. A method according to claim 1, wherein said identifying holes further includes recording said holes in a list of holes for each of said each one of said temporary items.

7. Apparatus for allocating registers in a compiler, comprising:
a) means for identifying and recording temporary items in a unit of code, each of said temporary items requiring storage;
b) means for identifying and recording a lifetime of each one of said temporary items, said lifetime of said each of said temporary items being an interval of time between the creation and the last use of said each of said temporary items in said unit of code;
c) means for identifying and recording holes in the lifetime of each one of said temporary items, said hole in the lifetime of said each one of said temporary items being an interval of time between a use and a store of said each one of said temporary items in said unit of code; and
d) means responsive to said recorded temporary items, lifetimes of temporary items and holes in lifetime for allocating to one of said registers one of said temporary items having a lifetime fitting within one of said holes of a second of said temporary items, said second temporary item having been previously allocated to said one register.

8. Apparatus according to claim 7 wherein said means for identifying and recording temporary items includes means for generating a list of said temporary items sorted by starting lifetime.

9. Apparatus according to claim 7 wherein said means for identifying and recording holes includes means for generating a list of said holes for each of said temporary items.

10. Apparatus according to claim 7 wherein said means for allocating includes means for generating a list for each register of the ones of said temporary items and the ones of said holes in said ones of said temporary items.

11. Apparatus according to claim 7 including means for converting an input code into an intermediate language expressed as an ordered list of tuples, and for creating from said list a flow graph of said unit of code.

12. Apparatus according to claim 7 wherein there are a number of said registers as defined by an architecture of a computer which is to execute object code generated by said compiler, and the apparatus includes:

means for making a list of said temporary items sorted by starting lifetime, wherein said allocating means allocates said temporary items in the order said temporary items appear in said temporary items list; and means responsive to data in said list of temporary items for forming a list for a selected one of said registers of ones of said temporary items allocated to said selected register, wherein said means for allocating to said one register uses said list for said selected register.

13. Apparatus according to claim 12 including means for converting an input code into an intermediate language expressed as an ordered list of tuples, and from said list of tuples creating a flow graph of said unit of code.

14. A method of allocating registers in an optimization of a unit of code for running on a computer architecture having a given number of registers, comprising the steps of:

a) identifying temporary items in said unit of code;
b) identifying a lifetime of each one of said temporary items, said lifetime of said each of said temporary items being an interval of time between the creation and the last use of said each of said of said temporary items in said unit of code;
c) identifying holes in the lifetime of each one of said temporary items said hole in the lifetime of said each one of said temporary items being an interval of time between a use and a store of said each one of said temporary items within said unit of code; and
d) allocating said registers to as many of said temporary items as there are registers available in said given number at any point in said unit, including storing for each register in separate lists said identified temporary items and said identified holes and allocating registers to the ones of said temporary items whose lifetimes fit within said holes.

15. A method according to claim 14 wherein said list of identified temporary items are sorted by starting lifetime and wherein said identified temporary items are allocated to registers in the order they appear in said list.

16. A method according to claim 15 wherein said step of allocating is responsive to said separate lists.

17. A method according to claim 16 including the steps of converting said unit of code into an intermediate language expressed as an ordered list of tuples, and from said list of tuples creating a flow graph of said unit of code.

18. Apparatus for allocating registers in an optimization stage of a compiler for generating object code for running on a computer architecture having a given number of registers, from a unit of high-level code, comprising:
- a) means for identifying temporary items in said unit of code;
- b) means for identifying a lifetime of each one of said temporary items, said lifetime of said each of said temporary items being an interval of time between the creation and the last use of said each of said of said temporary items in said unit of code;
- c) means for identifying holes in the lifetime of each one of said temporary items said hole in the lifetime of said each one of said temporary items being an interval of time between a use and a store of said each one of said temporary items within said unit of code; and
- d) means for allocating said registers to as many of said temporary items as there are registers available in said given number at any point in said unit of code, including storing for each register in separate lists said identified temporary items and said identified holes and allocating said registers to the ones of said temporary items whose lifetime fits within one of said holes.

19. Apparatus according to claim 18 wherein said lists are sorted by starting lifetime and wherein said allocating means allocates registers to said temporary items in the order they appear in said list.

* * * * *